United States Patent [19]
McInnes

[11] Patent Number: 5,960,836
[45] Date of Patent: Oct. 5, 1999

[54] METHOD AND APPARATUS FOR INJECTING FLUID INTO INFLATED TIRES

[76] Inventor: Robert P. McInnes, 17 Bamboo Dr., Briney Breezes, Fla. 33435

[21] Appl. No.: 09/039,478

[22] Filed: Mar. 16, 1998

[51] Int. Cl.⁶ .................................................. B65B 31/00
[52] U.S. Cl. .............................. 141/38; 141/1; 152/415; 72/380; 72/384; 72/477; 81/15.6; 81/15.5; 81/15.2
[58] Field of Search .......................... 141/38, 1; 81/15.6, 81/15.5, 15.2, 44, 30 A; 152/415; 29/221.5; 72/380, 384, 477, 479, 480

[56] References Cited

U.S. PATENT DOCUMENTS

| | | | |
|---|---|---|---|
| 2,320,042 | 5/1943 | McMahan | 152/415 |
| 4,308,766 | 1/1982 | Myers | 81/15.6 |
| 5,403,417 | 4/1995 | Dudley | 156/97 |
| 5,472,023 | 12/1995 | Fogal, Sr. et al. | 141/9 |
| 5,472,031 | 12/1995 | Austin | 152/415 |

*Primary Examiner*—Henry J. Recla
*Assistant Examiner*—Huyen Le
*Attorney, Agent, or Firm*—Alvin S. Blum

[57] ABSTRACT

Apparatus injects fluid such as sealing and balancing fluid into inflated tires, even two tires on a dual rim wheel, while on a vehicle. It seals to the valve stem so that the valve core can be unscrewed and retracted under pressure, providing an unobstructed fluid injection path before replacing the core without significant pressure loss. Tools for bending tire stems in situ facilitate apparatus installation. The method includes the steps of: sealing a valve assembly to the valve stem; sealing a valve core remover to the assembly; opening a valve of the assembly; passing a core engager through the valve and into the valve stem; engaging and unscrewing the core; allowing tire pressure to blow the core into the remover; closing the valve; removing the core remover; sealing a fluid dispenser to the assembly; opening the valve; dispensing the fluid; closing the valve; replacing the dispenser with the core remover; opening the valve; pushing the core into the stem; screwing the core into the stem; and removing the apparatus.

11 Claims, 2 Drawing Sheets

METHOD AND APPARATUS FOR INJECTING FLUID INTO INFLATED TIRES

BACKGROUND OF THE INVENTION

This invention relates to apparatus for introducing sealing and balancing fluid into pneumatic tires and more particularly to devices for doing so while the tire remains pressurized and even mounted beside another tire on a vehicle.

U.S. Pat. No. 4,308,766 issued Jan. 5, 1982 to Myers reviews the problems inherent in introducing fluid sealant into a tire through the valve stem and the advantages of being able to do this without first deflating the tire. It discloses a device for unscrewing and removing the valve core, injecting the fluid, and replacing the valve core while the tire remains inflated.

One of the most important applications for such a device is on heavy duty trucks. The tires are mounted in a parallel pair on a dual tire rim. The valve stems are both mounted so that they extend toward one another on a common side. Access to the stems is through small openings in the wheel. The access to the inner tire stem may allow, in certain cases, the use of the device of Myers. However, the outer tire valve stem is pointing inboard, and there is no room to manipulate such a tool in those confines. It would be most useful to have a tool which can be used to inject sealing and/or balancing fluid into tires while they remain inflated and mounted on a dual tire rim wheel.

SUMMARY OF THE INVENTION

It is accordingly an object of the invention to provide tools that will enable a user to inject fluid into tires while they are mounted on dual rims and inflated. It is a further object that they provide means to unscrew the valve core, remove the valve core from a fluid injection path to provide a passage for the fluid unobstructed by the valve core, reinsert and screw in the valve core after the fluid has been injected, and all while the tire is inflated on a dual rim with limited access to the valve stem.

These and other objects, advantages and features of the invention will become more apparent when the detailed description is studied in conjunction with the drawings, in which like reference characters designate like elements in the various drawing figures.

DETAILED DESCRIPTION OF PREFERRED EMBODIMENTS

Figure 1:
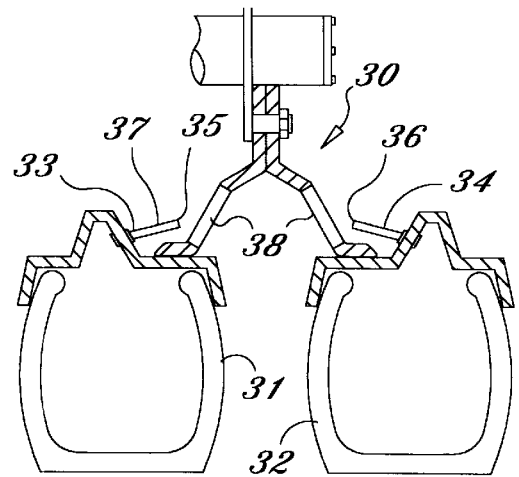
FIG. 1 is a sectional view of two tires mounted on a dual wheel.

Referring now first to FIG. 1, a dual rim wheel 30 such as those mounted on heavy duty trucks is shown with an inboard tire 31 and an outboard tire 32 mounted on the dual rim. Valve stems 33 and 34 are positioned at apertures 38 in the wheel to provide access for inflation and pressure testing at the valve stem ports 35. It is very difficult to remove the valve core 36 in the stem and to pump sealant fluid into the tire while it is mounted and inflated because access is so limited at apertures 38. The apparatus and method of the invention enable an operator to easily perform this task.

In order to fit the apparatus onto the valve stem, in some situations, it may be necessary to bend the valve stem of one or both of the mounted tires.

Figure 10:
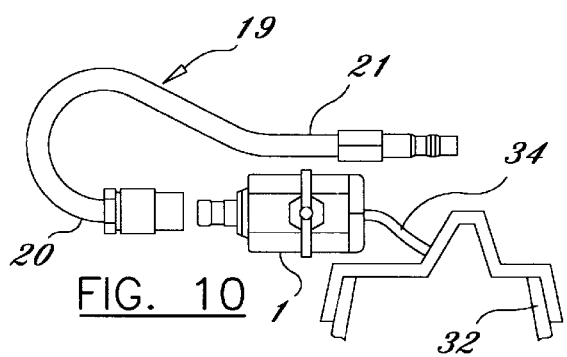
FIG. 10 is a partial sectional view as in FIG. 8 with U shaped fill tube ready to be connected.
Figure 11:
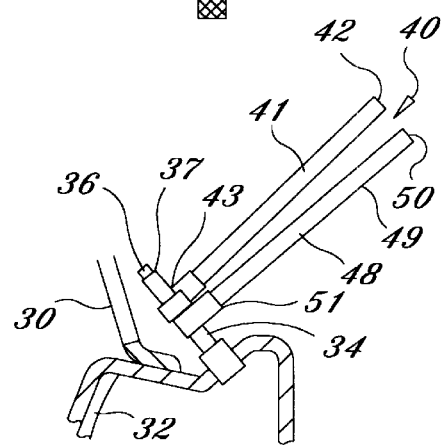
FIG. 11 is a side elevation view, partially in section, of a valve stem bender bending the stem of an outboard tire while the tire is pressurized and mounted as the outboard tire.
Figure 12:
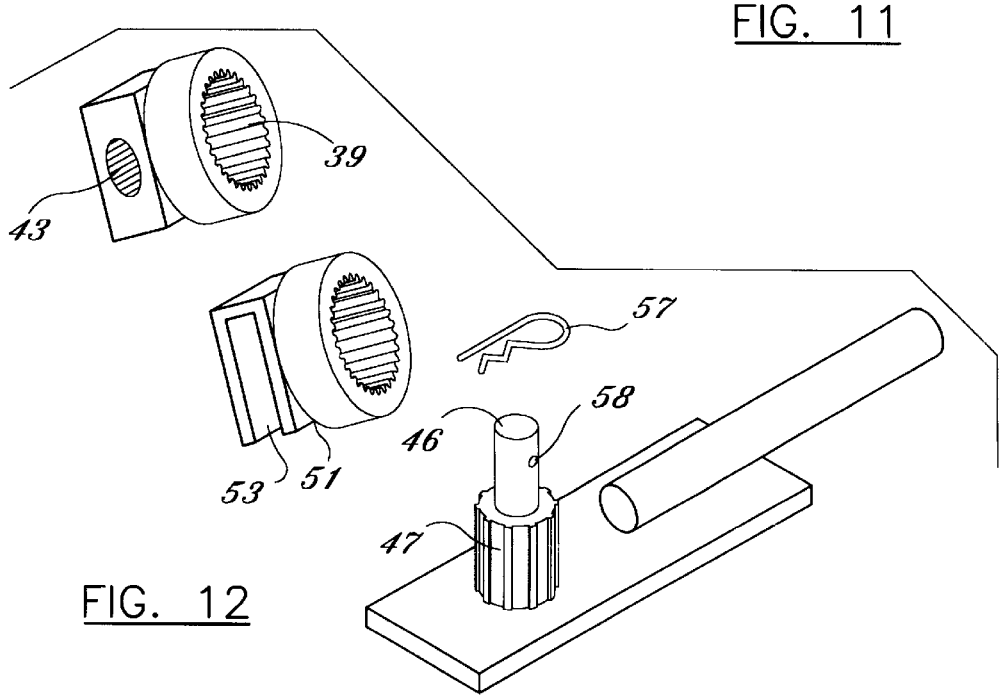
FIG. 12 is an exploded view of the tire bender.

Referring now to FIGS. 10–12, the valve stem 34 of the outboard tire 32 has been bent in place as shown in FIG. 10 by use of the tire bender 40 of the invention. The bender 40 comprises an elongate stem bending lever 41 having a handle 42 at a first extremity and a stem receiving cylindrical passage 43 at a second extremity for receiving therethrough the free end of the valve stem. The cylindrical passage 43 is movably mounted on an axle 46 orthogonal to the long axis of the lever 41 to adjust the angle as required. The adjustable angle is fixed by means of the splined connection 47 cooperating with the inner gear 39 that is held in place by hairpin 57 through hole 58 in the axle 46.

The bender 40 further comprises valve stem holder 48 having an elongate shaft 49, a handle 50 at one end and a stem engaging member 51 at another end that is movably mounted on axle 46 by adjustable angle means as described for the bending lever 41. The stem engaging member 51 has a slot 53 that is open at both ends and one side so that it may be easily placed on a stem close to the rim to hold the stem steady while bending the stem with lever 41. The holder is then easily removed from the bent stem. Because the bend forms between the holder 48 and the lever 41, the lever 41 is easily pulled free of the straight free end of a bent stem. This bender may also be employed to bend a stem to facilitate application of a compressed air chuck or a tire pressure gauge.

Referring now to FIGS. 1–6, apparatus and method for pumping fluid into the inboard tire 31 through stem 33 that is directed outwardly will be described. This will also apply to singly mounted tires. A valve assembly 1 has a sealable straight through axial passage 2 when open; a female threaded end 3 for sealing on the male thread 37 of a valve stem port, and a second end provided with a male member 4 of a quick connect hydraulic coupling of the type well known in the art. A threaded extension tube 28 may optionally be provided with a male thread 37 to fit into female threaded end 3 and a female threaded end 3a to seal onto the stem port.

Figures 2, 3:
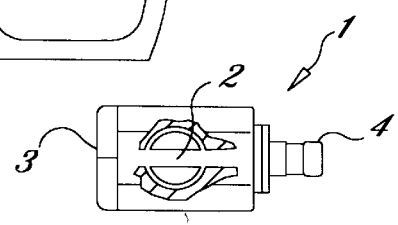
FIG. 2 is a top view, partially broken away, of the valve assembly.
FIG. 3 is a top view of the extension tube for the inboard tire stem.
Figure 4:
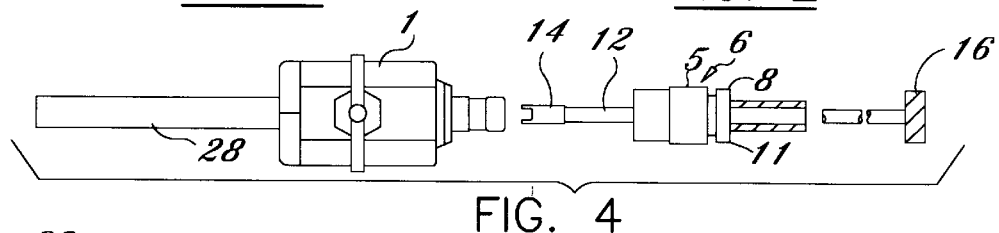
FIG. 4 is a top view, partially broken away, of a core remover for the inboard tire stem with valve assembly and extension tube.
Figure 5:
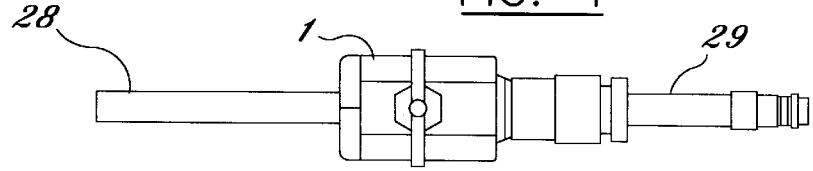
FIG. 5 is a top view of the valve assembly and extension tube after valve core has been removed and straight fill tube connected.

The valve assembly 1 is directly threaded onto the valve stem port threaded end 37 or onto extension 28 which is then threaded onto the stem. The valve is opened, as shown in FIG. 2.

The core remover 6 is then sealingly snapped onto the stem mounted valve assembly 1 at connecting means 4 by pulling back sleeve 5 of the quick connect coupling at the open end of remover body 8. An axial chamber 7 within the body 8 has a vented wall 11 opposite the open end. An elongate operating shaft 12 extends axially through the vent opening and is provided with a control knob 16 at one end and a bifurcated valve core engaging means 14 at another end. The shaft 12 reciprocates axially. When valve assembly 1 is open, the shaft is extended so that end 14 engages the valve core (not shown) in the stem using knurled control 16 which is then rotated until the valve core is unthreaded from the stem. Air pressure in the stem then blows the core and the shaft out past the valve and into the internal chamber 7 of the remover. The end 14 is stopped by wall 11, and the valve core rests inside the chamber 7. Venting the chamber at wall 11 ensures that air pressure differential will be maintained to blow the valve core into the remover.

The valve is then closed and the remover with the core is uncoupled from the valve assembly. The valve stem free of core is now ready to receive the fluid from pressurized fluid source 18 with flexible hose 17 and valve 27. The valve may be snapped directly onto the valve assembly 1 with its quick connect coupling, or extension fill tube 29 may be interposed as necessitated by particular space considerations. After snapping on valve 27, both valves are opened and fluid is dispensed into the inflated tire as desired. The valves are then closed and valve 27 removed. The core remover 6 is then snapped onto assembly 1, the valve opened, and the core is pushed into the stem with control knob 16 against the air pressure and rotated until the core is sealed in the valve stem. The apparatus is then removed from the valve stem, the core keeping the air Pressure in the tire.

Figure 6:
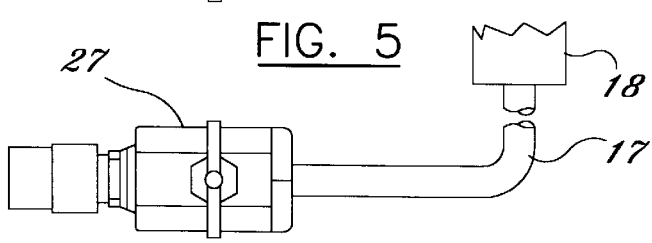
FIG. 6 is a top view of the pressurized fluid source with flexible hose.
Figure 7:
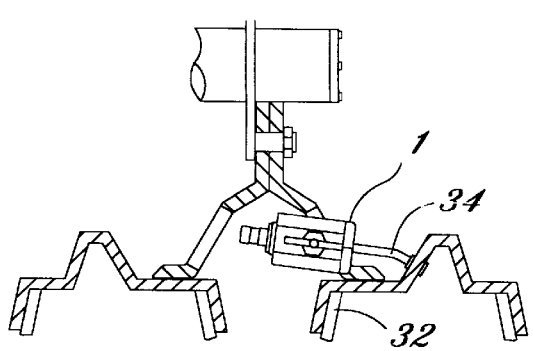
FIG. 7 is a partial sectional view as in FIG. 1 with valve assembly mounted on the bent outboard valve stem.
Figure 8:
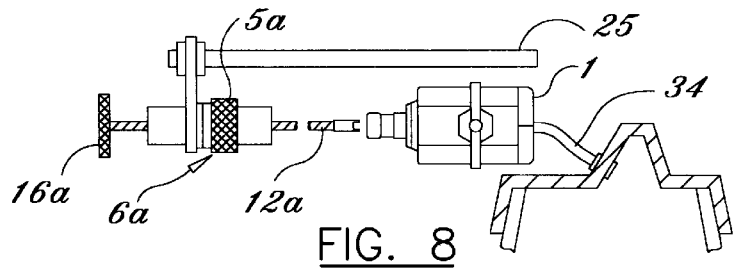
FIG. 8 is a partial sectional view as in FIG. 7 with offset valve core remover.
Figure 9:
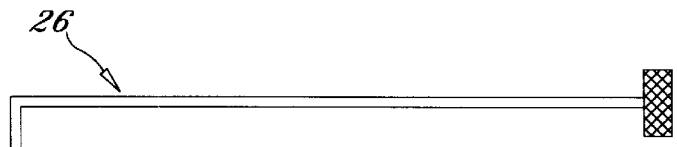
FIG. 9 is a top view of the device for pulling the operating shaft to force the valve core into screw-in position.

Referring now to FIGS. 1 and 6–10, the apparatus and method for pumping fluid into the outboard tire 32 through stem 34 that is directed inwardly will be described. The valve assembly 1 is screwed onto the valve port 35 of the straight or bent valve stem 34. Valve core remover 6a differs from remover 6 in having a flexible shaft 12a and an elongate handle 25 so that it can be manipulated in a confined space and pulled into coupling connection with assembly 1 by pulling on handle 25 with one hand while retracting sleeve 5a with the other hand. The valve is opened and the shaft 12a is advanced into the stem until the core is engaged. The core is then unscrewed with control knob 16a, and the core is blown into remover 6a. The valve is then closed and remover 6a uncoupled. As shown in FIG. 10, a U-shaped tubular extension piece 19 has a short leg 20 snapped onto the valve assembly 1 and a long leg 21 adapted for quick connecting to the valve 27 of pressurized fluid source 18 (FIG. 6). This arrangement puts the valve 27 outside the tire for easy connection and manipulation and causes the fluid to make a 180° turn in its path into the stem. The valves are opened, the fluid dispensed, and the valves closed. The tube 19 is removed and the remover 6a installed and the core pushed into the valve stem and screwed into place, using offset tool 26 that engages the center of knob 16 that can be manipulated from outside the wheel. The remover and valve assembly are then disconnected and the task is complete.

The above disclosed invention has a number of particular features which should preferably be employed in combination although each is useful separately without departure from the scope. of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. Apparatus used primarily with inflated tires mounted side by side on a dual wheel having a threaded valve stem port provided with a removable threaded valve core, in which the inboard tire has a valve stem directed outwardly at an aperture in the wheel and the outboard tire has a valve stem directed inwardly at an aperture in the wheel, the apparatus comprising:

A) a first valve assembly with a sealable axial through passage, a first connecting means for sealably connecting with a valve stem port and a second connecting means for quick sealing connection;

B) a core remover comprising: a body with an axial internal chamber having an opening at one end provided with means for sealingly communicating with the second connecting means; a vented chamber wall opposite the opening; an elongate operating shaft extending through, and guided by, the vented wall; the operating shaft having at a first extremity means for engaging and unfastening a core in the valve stem and the shaft having, at a second extremity located outside the vented wall, a control means to cooperate with the first end to fasten or unfasten the core, the shaft being mounted for reciprocating axial motion between an extended first position in which the first extremity extends past the opening and into the tire stem for engaging the core and a retracted second position in which the unfastened core is stored within the chamber and the first extremity is adjacent the vented wall;

C) a fluid applicator having a flexible hose operatively connected to a fluid supply at a first terminus and having, at a free second terminus, third connecting means for sealingly communicating with the second connecting means to pass fluid from the fluid supply into the inflated tire after the tire core has been removed and stored in the core remover; and D) a tire stem bender means for bending the tire stem on a mounted, inflated tire to position the stem port for enhanced access thereto by the fluid applicator.

2. The apparatus according to claim 1, in which the operating shaft is flexible.

3. The apparatus according to claim 2, in which the second connecting means is connected to the core remover by a means for quick connecting having an axially displacable locking sleeve, the core remover having an elongate handle for use during operation of the sleeve.

4. The apparatus according to claim 3, further comprising means for remotely urging the shaft toward the extended position during fastening of the core.

5. The apparatus according to claim 1, in which the third connecting means further comprises:

a substantially U shaped tubular extension piece having a short leg terminating in a quick connector and a long leg terminating in another quick connector; and said free second terminus of said hose provided with means for providing removable sealing communication with said another quick connector to provide a supply of fluid to the tire.

6. The apparatus according to claim 5, in which the second terminus is provided with a valve.

7. Apparatus used primarily with inflated tires mounted side by side on a dual wheel having a threaded valve stem port provided with a removable threaded valve core, in which the inboard tire has a valve stem directed outwardly at an aperture in the wheel and the outboard tire has a valve stem directed inwardly at an aperture in the wheel, the apparatus comprising:

A) a first valve assembly with a sealable axial through passage, a first connecting means for sealably connecting with a valve stem port and a second connecting means for quick connection sealing;

B) a core remover comprising: a body with an axial internal chamber having an opening at one end provided with means for sealingly communicating with the second connecting means; a vented chamber wall opposite the opening; an elongate operating shaft extending through, and guided by, the vented wall; the operating shaft having at a first extremity means for engaging and unfastening a core in the valve stem and the shaft having, at a second extremity located outside the vented wall, a control means to cooperate with the first end to fasten or unfasten the core, the shaft being mounted for reciprocating axial motion between an extended first position in which the first extremity extends past the opening and into the tire stem for engaging the core and a retracted second position in which the unfastened core is stored within the chamber and the first extremity is adjacent the vented wall; and C) a fluid applicator having a flexible hose operatively connected to a fluid supply at a first terminus and having, at a free second terminus, third connecting means for sealingly communicating with the second connecting means to pass fluid from the fluid supply into the inflated tire after the tire core has been removed and stored in the core remover.

8. The apparatus according to claim 7, in which the third connecting means further comprises:

a substantially U shaped tubular extension piece having a short leg terminating in quick connector and a long leg terminating in another quick connector; and said free second terminus of said hose provided with means for providing removable sealing communication with said another quick connector to provide a supply of fluid to the tire.

9. A tire valve stem bender for bending a tire stem while it is on a wheel-mounted inflated tire to position the valve stem port for enhanced access to a fluid dispensing applicator, the bender comprising:

A) a stem bending lever having an elongate intermediate portion; a handle at a first extremity; a stem receiving means movably mounted to a second extremity about an axis perpendicular to the lever long axis for receiving therethrough in a cylindrical passage the valve stem port; and means for adjustably fixing the angle between the cylindrical passage and the lever long axis; and B) a stem holder having an elongate shaft, a handle at a first end; a stem engaging member movably mounted to a second end about an axis perpendicular to the shaft long axis; the member having a slot means open at both ends and open at a side away from the shaft for receiving therein the valve stem at a location away from the valve stem port; and means for adjustably fixing the angle between the slot means and the shaft long axis, such that the stem may be held steady by the holder while the free end of the valve stem is bent by the bending lever.

10. A method for dispensing fluid through the valve stem port of an inflated tire mounted on a wheel, the method comprising the steps of:

A) sealingly connecting a valve assembly to the valve stem port of an inflated tire;

B) sealingly connecting a valve core remover to the valve assembly;

C) opening the valve of the valve assembly;

D) passing an operating shaft of the core remover through the valve to engage and unscrew the core from the valve stem;

E) permitting pressure in the tire to blow the valve core through the valve and into the core remover;

F) closing the valve;

G) removing the core remover from the valve assembly;

H) sealingly attaching a fluid dispenser outlet to the valve assembly;

I) opening the valve;

J) dispensing the fluid;

K) closing the valve;

L) detaching the fluid dispenser outlet from the valve assembly;

M) sealingly attaching the core remover with its contained valve core;

N) opening the valve;

O) advancing the valve core through the open valve and the valve stem port and fastening it in place with the operating shaft;

P) retracting the operating shaft;

Q) removing the valve core remover; and

R) removing the valve assembly from the tire stem.

11. The method of claim 10 further comprising the preliminary steps of:

engaging the valve stem with a levered holder away from the stem port;

engaging the valve stem at the stem port end with a levered bender; and bending the valve stem with the bender while holding the stem steady with the holder to position the stem port at a more favorable position for application of the devices necessary for fluid dispensing.

* * * * *